United States Patent
Inoue et al.

(10) Patent No.: US 12,392,263 B2
(45) Date of Patent: Aug. 19, 2025

(54) POWER GENERATING SYSTEM AND POWER GENERATING METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shota Inoue, Yokohama Kanagawa (JP); Yasushi Yamamoto, Yokohama Kanagawa (JP); Takashi Ogawa, Yokohama Kanagawa (JP); Tomohiro Tejima, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/754,381

(22) Filed: Jun. 26, 2024

(65) Prior Publication Data
US 2025/0003355 A1    Jan. 2, 2025

(30) Foreign Application Priority Data
Jun. 27, 2023    (JP) ................. 2023-105425

(51) Int. Cl.
*F01K 25/10*    (2006.01)
*B01D 53/14*    (2006.01)
(Continued)

(52) U.S. Cl.
CPC ........ *F01K 25/103* (2013.01); *B01D 53/1475* (2013.01); *B01D 53/18* (2013.01);
(Continued)

(58) Field of Classification Search
CPC ........ F01K 25/103; F01K 9/003; F01K 21/04; B01D 53/1475; B01D 53/18;
(Continued)

(56) References Cited

U.S. PATENT DOCUMENTS 8,656,719 B2    2/2014    Kosaka et al.
9,598,993 B2    3/2017    Younes et al.
(Continued)

FOREIGN PATENT DOCUMENTS

JP    2012-184712 A    9/2012
JP    2013-151876 A    8/2013
(Continued)

OTHER PUBLICATIONS

JP-2022049466-A (English Translation) (Year: 2022).*
Takashi Ogawa et al., "Acidic Gas Recovery Apparatus and Acidic Gas Recovery Method".

*Primary Examiner* — Shafiq Mian
(74) *Attorney, Agent, or Firm* — Foley & Lardner LLP

(57) ABSTRACT

In one embodiment, a power generating system includes a cooling absorption tower configured to cause an absorption liquid to absorb carbon dioxide in atmosphere. The system further includes an evaporator configured to heat the absorption liquid to release the carbon dioxide and water vapor from the absorption liquid, and discharge the absorption liquid that has released the carbon dioxide and the water vapor, and a first gas including the carbon dioxide and the water vapor. The system further includes a turbine configured to be driven by a portion of the first gas. The system further includes a generator configured to be driven by the turbine. The system further includes a capturer configured to condense the water vapor included in a remaining portion of the first gas, and capture the carbon dioxide that is included in the remaining portion of the first gas and to be a capture target.

15 Claims, 3 Drawing Sheets

(51) Int. Cl.
  *B01D 53/18*   (2006.01)
  *B01D 53/26*   (2006.01)
  *F01K 9/00*    (2006.01)
  *F01K 21/04*   (2006.01)

(52) U.S. Cl.
  CPC ............ *B01D 53/265* (2013.01); *F01K 9/003* (2013.01); *F01K 21/04* (2013.01); *B01D 2257/504* (2013.01); *B01D 2257/80* (2013.01); *B01D 2259/45* (2013.01)

(58) Field of Classification Search
  CPC ............ B01D 53/265; B01D 2257/504; B01D 2257/80; B01D 2259/45
  See application file for complete search history.

(56) References Cited

U.S. PATENT DOCUMENTS

| | | |
|---|---|---|
| 10,436,518 B2 | 10/2019 | Ahlbom |
| 2023/0340909 A1* | 10/2023 | Allison .................... F23R 3/28 |

FOREIGN PATENT DOCUMENTS

| | | | |
|---|---|---|---|
| JP | 2017-512941 A | | 5/2017 |
| JP | 2017-166331 A | | 9/2017 |
| JP | 2017-172450 A | | 9/2017 |
| JP | 2018-080696 A | | 5/2018 |
| JP | 2018-525212 A | | 9/2018 |
| JP | 2020-131166 A | | 8/2020 |
| JP | 6738920 B1 | | 8/2020 |
| JP | 6916714 B2 | | 8/2021 |
| JP | 2022049466 A | * | 3/2022 |

\* cited by examiner

POWER GENERATING SYSTEM AND POWER GENERATING METHOD

CROSS REFERENCE TO RELATED APPLICATION

This application is based upon and claims the benefit of priority from the prior Japanese Patent Application No. 2023-105425, filed on Jun. 27, 2023, the entire contents of which are incorporated herein by reference.

FIELD

Embodiments described herein relate to a power generating system and a power generating method.

BACKGROUND

In order to realize a net-zero (carbon-neutral) society by 2050, there is a need for negative emission technology for capturing and storing carbon dioxide ($CO_2$) in the atmosphere. As a method for selectively separating and capturing $CO_2$ from the atmosphere, methods using temperature swings and pressure swings are known. In this case, it is necessary to reduce the energy required for heating and depressurization.

DETAILED DESCRIPTION

Figure 1:
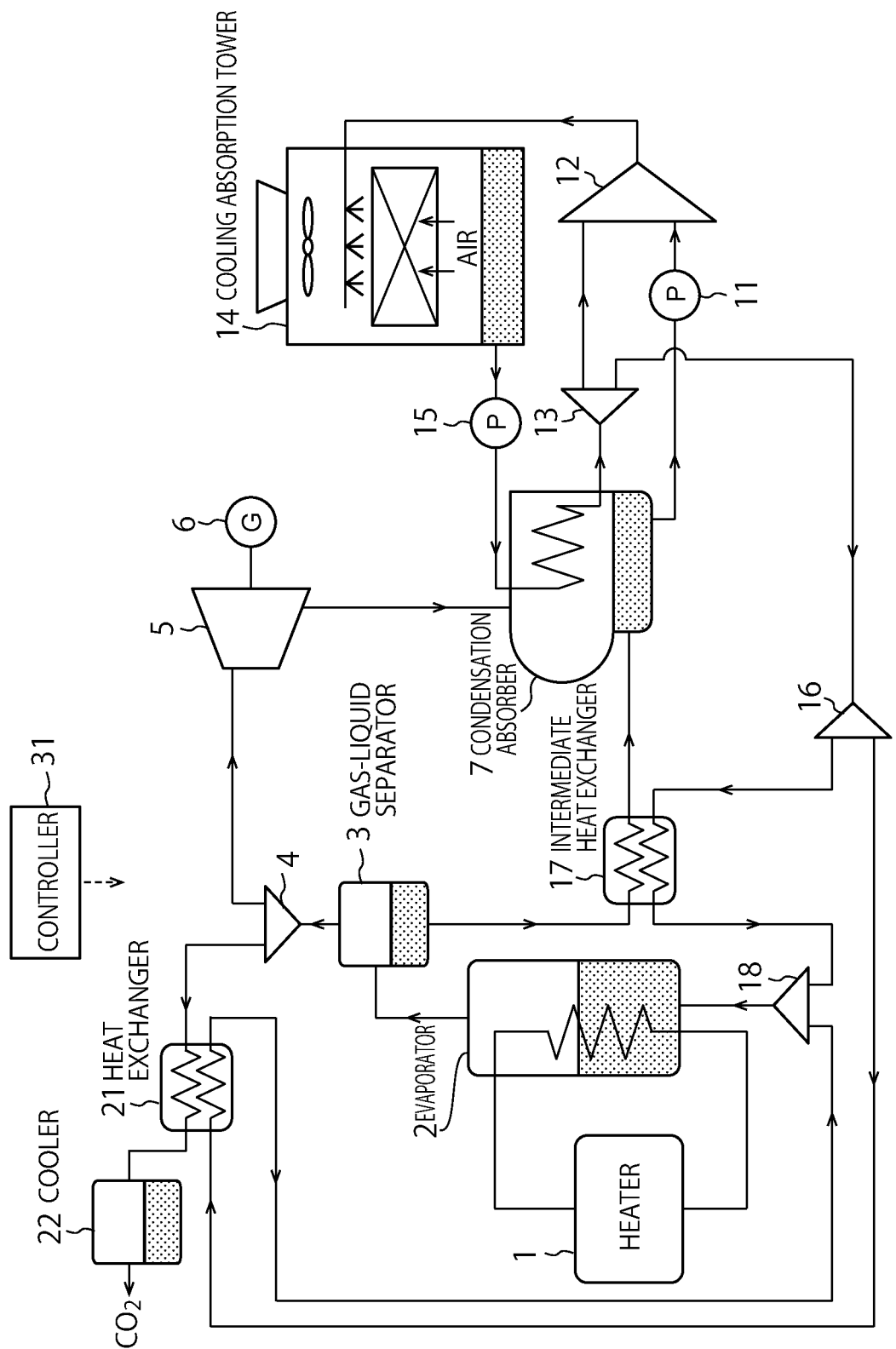
FIG. 1 is a schematic diagram showing a configuration of a power generating system of a first embodiment.
Figure 2:
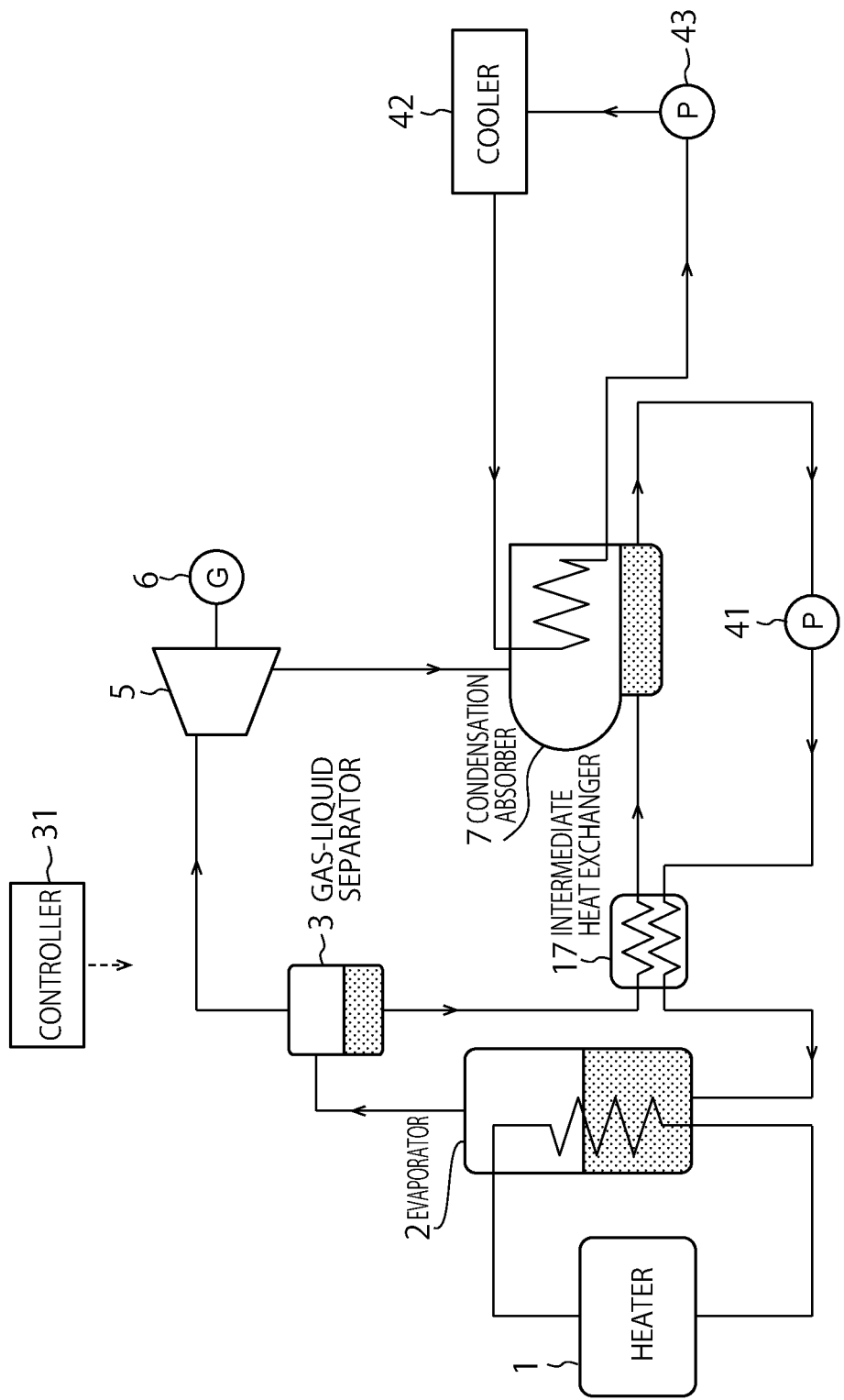
FIG. 2 is a schematic diagram showing a configuration of a power generating system of a comparative example of the first embodiment.
Figure 3:
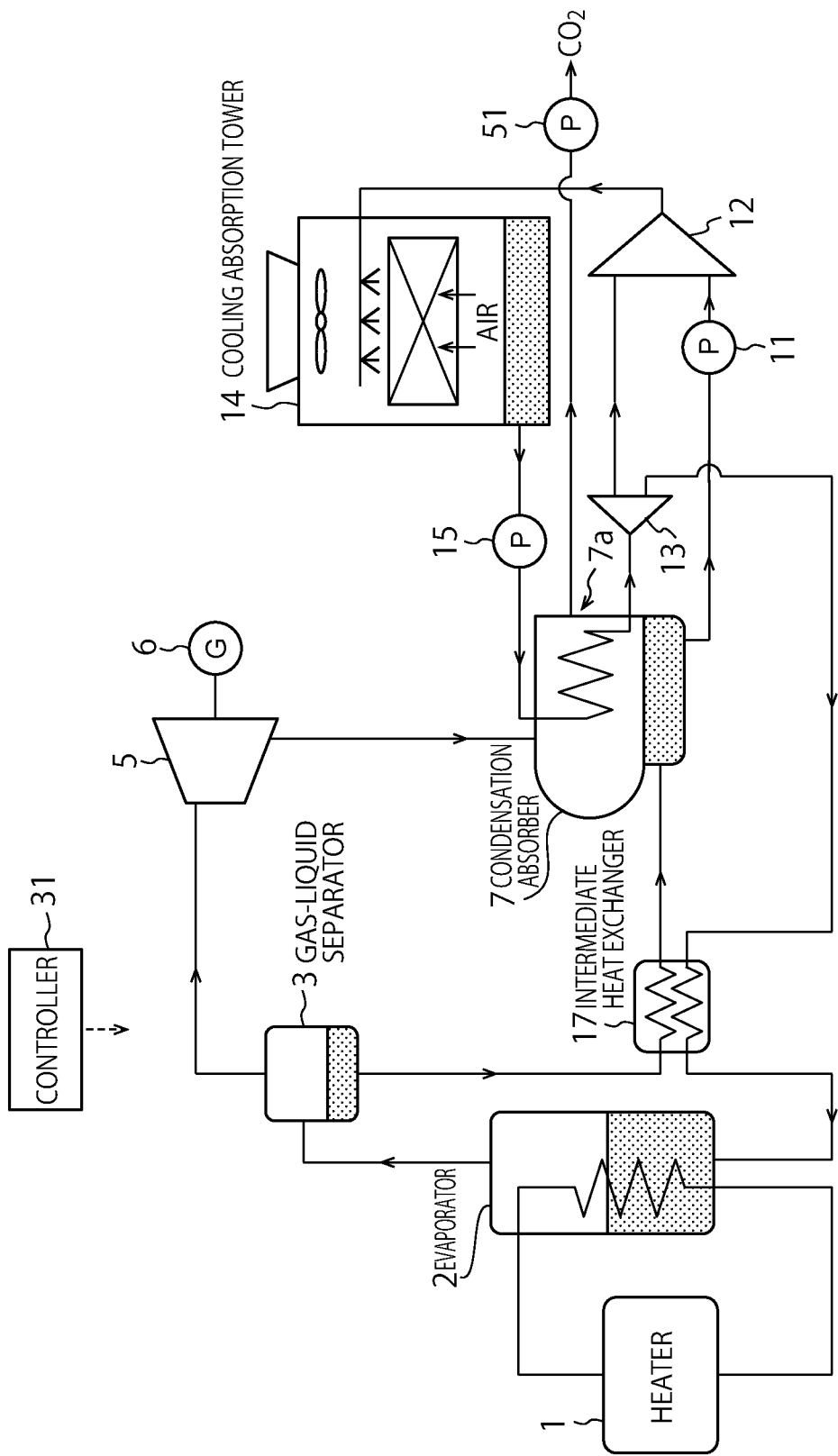
FIG. 3 is a schematic diagram showing a configuration of a power generating system of a second embodiment.

Embodiments will now be explained with reference to the accompanying drawings. In FIGS. 1 to 3, the same configurations are given the same reference numeral, and duplicate description is omitted.

As a system that handles $CO_2$, there is known a power generating system that generates power using an absorption liquid capable of absorbing $CO_2$. This power generating system generates power by driving a turbine with $CO_2$ gas and water vapor (steam). Further, this power generating system circulates the $CO_2$ gas and the water vapor in a closed cycle, and generates power without being continuously supplied with media from outside the system.

As another system for handling $CO_2$, there is known a $CO_2$ capturing system that captures $CO_2$ from exhaust gas using an absorption liquid capable of absorbing $CO_2$. This $CO_2$ capturing system requires thermal energy in releasing $CO_2$ from the absorption liquid. Since this energy is enormous, the operating cost of the $CO_2$ capturing system increases. Therefore, in order to spread $CO_2$ capturing systems, it is necessary to reduce the energy used in the $CO_2$ capturing systems. Further, when $CO_2$ is captured from the atmosphere, a large amount of power to drive a blower fan and a large amount of thermal energy to regenerate $CO_2$ are required, and it is also necessary to reduce this energy.

In one embodiment, a power generating system includes a cooling absorption tower configured to cause an absorption liquid to absorb carbon dioxide in atmosphere. The system further includes an evaporator configured to heat the absorption liquid to release the carbon dioxide and water vapor from the absorption liquid, and discharge the absorption liquid that has released the carbon dioxide and the water vapor, and a first gas including the carbon dioxide and the water vapor. The system further includes a turbine configured to be driven by a portion of the first gas. The system further includes a generator configured to be driven by the turbine. The system further includes a capturer configured to condense the water vapor included in a remaining portion of the first gas, and capture the carbon dioxide that is included in the remaining portion of the first gas and to be a capture target.

First Embodiment

FIG. 1 is a schematic diagram showing a configuration of a power generating system of a first embodiment. The power generating system of the present embodiment is a $CO_2$ capturing and power generating system having a function to capture (collect) $CO_2$ from the atmosphere, and a function to generate power using this $CO_2$.

As shown in FIG. 1, the power generating system of the present embodiment includes a heater 1, an evaporator 2, a gas-liquid separator 3, a flow divider 4, a turbine 5, a generator 6, a condensation absorber 7, a pump 11, a flow merger 12, a flow divider 13, a cooling absorption tower 14, a pump 15, a flow divider 16, an intermediate heat exchanger 17, a flow merger 18, a heat exchanger 21, a cooler 22, and a controller 31. The intermediate heat exchanger 17 is an example of a first heat exchanger. The heat exchanger 21 is an example of a second heat exchanger. The cooler 22 is an example of the capturer.

The heater 1 supplies heat for heating an absorption liquid in the evaporator 2 to the evaporator 2. The absorption liquid is a liquid having the action of absorbing $CO_2$, for example, an organic solvent, a hydrophobic $CO_2$ absorption liquid, an amine-based aqueous solution, an amino acid salt absorption liquid, or an alkaline aqueous solution, but is not limited to these examples.

The evaporator 2 is supplied with the absorption liquid (rich liquid) that has absorbed $CO_2$ from the cooling absorption tower 14 via the condensation absorber 7, and heats the absorption liquid with the heat from the heater 1. As a result, in the evaporator 2, $CO_2$ and water vapor are released from the absorption liquid. The evaporator 2 discharges the absorption liquid (lean liquid) that has released $CO_2$ and water vapor and a mixed gas including $CO_2$ and water vapor. In other words, a circulating medium in a gas-liquid two-phase state including the absorption liquid and the mixed gas is discharged from the evaporator 2. This mixed gas is an example of a first gas.

The gas-liquid separator 3 is supplied with the circulating medium including the absorption liquid and the mixed gas from the evaporator 2, and separates the circulating medium into the absorption liquid and the mixed gas. The gas-liquid separator 3 discharges the mixed gas separated from the circulating medium to the flow divider 4, and discharges the absorption liquid separated from the circulating medium to the condensation absorber 7 via the intermediate heat exchanger 17.

The flow divider 4 divides the mixed gas discharged from the gas-liquid separator 3 into a mixed gas flowing into the turbine 5 and a mixed gas flowing into the cooler 22 via the heat exchanger 21. The mixed gas flowing into the turbine 5 is an example of a portion of the divided first gas. The mixed gas flowing into the cooler 22 via the heat exchanger 21 is an example of the remaining portion of the divided first gas.

The turbine 5 is supplied with the mixed gas from the flow divider 4, is driven by the mixed gas, and discharges the mixed gas to the condensation absorber 7. The mixed gas rotationally drives the turbine 5 by adiabatically expanding in the turbine 5.

The generator 6 is driven by the turbine 5 to generate power. Thus, the power generating system of the present embodiment generates power using a mixed gas including $CO_2$ gas and water vapor.

The condensation absorber 7 is supplied with the high-temperature mixed gas from the turbine 5, is supplied with the high-temperature absorption liquid from the gas-liquid separator 3 via the intermediate heat exchanger 17, and is supplied with the low-temperature absorption liquid from the cooling absorption tower 14. The high-temperature absorption liquid is stored at the bottom of the condensation absorber 7. On the other hand, the low-temperature absorption liquid passes through a pipe provided in the condensation absorber 7 from an inlet to an outlet of the condensation absorber 7. Therefore, the low-temperature absorption liquid flows in the condensation absorber 7 without being mixed with the high-temperature absorption liquid. The low-temperature absorption liquid cools the high-temperature absorption liquid and the high-temperature mixed gas when flowing in the condensation absorber 7. As a result, the water vapor included in the mixed gas is condensed into condensed water, and the condensed water is mixed into the high-temperature absorption liquid. On the other hand, the $CO_2$ included in the mixed gas is absorbed by the high-temperature absorption liquid. The condensation absorber 7 discharges the high-temperature absorption liquid (semi-lean liquid) that has absorbed $CO_2$ to the pump 11.

The pump 11 pressurizes the high-temperature absorption liquid discharged from the condensation absorber 7. The absorption liquid pressurized in the pump 11 is sent to the flow merger 12.

The flow merger 12 merges the high-temperature absorption liquid supplied from the pump 11 and the low-temperature absorption liquid supplied from the flow divider 13. The absorption liquid merged in the flow merger 12 is supplied to the cooling absorption tower 14.

The flow divider 13 divides the low-temperature absorption liquid supplied from the condensation absorber 7 into an absorption liquid flowing into the flow merger 12 and an absorption liquid flowing into the flow divider 16.

The cooling absorption tower 14 is supplied with the absorption liquid that has absorbed $CO_2$ from the flow merger 12, and brings the absorption liquid into contact with the atmosphere. As a result, $CO_2$ in the atmosphere is absorbed by the absorption liquid, and the absorption liquid is deprived of heat by the atmosphere to be cooled. The cooling absorption tower 14 discharges the absorption liquid (rich liquid) that has absorbed $CO_2$ in the atmosphere and has been cooled to the pump 15. The cooling absorption tower 14 of the present embodiment includes a blower fan for taking the atmosphere into the cooling absorption tower 14 and bringing the taken atmosphere into contact with the absorption liquid. The cooling absorption tower 14 of the present embodiment has a makeup water function or includes a pre-humidifier for humidifying the atmosphere in advance, in preparation for the case where the moisture in the absorption liquid is taken out of the cycle system through the atmosphere due to contact between the absorption liquid and the atmosphere.

The pump 15 pressurizes the low-temperature absorption liquid discharged from the cooling absorption tower 14. The absorption liquid pressurized in the pump 15 is sent to the condensation absorber 7. This absorption liquid is used as a coolant for cooling the high-temperature absorption liquid and the high-temperature mixed gas in the condensation absorber 7 as described above.

The flow divider 16 divides the absorption liquid supplied from the flow divider 13 into an absorption liquid flowing into the flow merger 18 via the intermediate heat exchanger 17 and an absorption liquid flowing into the flow merger 18 via the heat exchanger 21.

The intermediate heat exchanger 17 performs heat exchange between the absorption liquid directed from the gas-liquid separator 3 to the condensation absorber 7 and the absorption liquid directed from the flow divider 16 to the flow merger 18. As a result, the former absorption liquid is cooled by heat exchange, and the latter absorption liquid is heated by heat exchange. Heat exchange is carried out in a state where the former absorption liquid and the latter absorption liquid are in non-contact.

The flow merger 18 merges the absorption liquid supplied from the flow divider 16 via the intermediate heat exchanger 17 and the absorption liquid supplied from the flow divider 16 via the heat exchanger 21. The absorption liquid merged in the flow merger 18 is supplied to the evaporator 2.

The heat exchanger 21 performs heat exchange between the mixed gas directed from the flow divider 4 to the cooler 22 and the absorption liquid directed from the flow divider 16 to the flow merger 18. As a result, the mixed gas is cooled by heat exchange, and the absorption liquid is heated by heat exchange. Heat exchange is carried out in a state where the mixed gas and the absorption liquid are in non-contact.

The cooler 22 is supplied with the mixed gas from the flow divider 4 via the heat exchanger 21, and cools the mixed gas. As a result, the water vapor included in the mixed gas is condensed into condensed water, and the concentration of water vapor included in the mixed gas decreases. That is, the mixed gas including $CO_2$ and water vapor changes into a capture target gas including high-purity $CO_2$. The cooler 22 captures the capture target gas including $CO_2$ that is to be a capture target in the power generating system of the present embodiment. $CO_2$ included in the capture target gas discharged from the cooler 22 may be liquefied inside or outside the power generating system of the present embodiment.

The controller 31 controls various operations of the power generating system of the present embodiment. The controller 31 controls, for example, liquid sending by the pumps 11 and 15, power generation by the turbine 5 and the generator 6, and operations of the condensation absorber 7, the cooling absorption tower 14, and the cooler 22.

Note that the power generating system of the present embodiment may not include some of the components shown in FIG. 1. For example, the power generating system of the present embodiment may not include the flow divider 16, the flow merger 18, and the heat exchanger 21.

FIG. 2 is a schematic diagram showing a configuration of a power generating system of a comparative example of the first embodiment. The power generating system of this comparative example has a function to generate power using $CO_2$, but does not have a function to capture $CO_2$ from the atmosphere.

Similar to the power generating system of the first embodiment, the power generating system of this comparative example includes the heater 1, the evaporator 2, the gas-liquid separator 3, the turbine 5, the generator 6, the condensation absorber 7, the intermediate heat exchanger 17, and the controller 31. The power generating system of this comparative example further includes a pump 41, a cooler 42, and a pump 43.

The pump 41 pressurizes the absorption liquid discharged from the condensation absorber 7. The absorption liquid pressurized in the pump 41 is sent to the evaporator 2 via the intermediate heat exchanger 17.

The cooler 42 is a component corresponding to the cooling absorption tower 14. The cooler 42 supplies a coolant different from the absorption liquid to the condensation absorber 7. The coolant passes through the pipe provided in the condensation absorber 7 from the inlet to the outlet of the condensation absorber 7. Therefore, the coolant flows in the condensation absorber 7 without being mixed with the absorption liquid. The coolant cools the absorption liquid and the mixed gas when flowing in the condensation absorber 7. As a result, the water vapor included in the mixed gas is condensed into condensed water, and the condensed water is mixed into the absorption liquid. On the other hand, the $CO_2$ included in the mixed gas is absorbed by the absorption liquid. The condensation absorber 7 discharges the absorption liquid (rich liquid) that has absorbed $CO_2$ to the pump 41.

The pump 43 pressurizes the coolant discharged from the condensation absorber 7. The coolant pressurized in the pump 43 is sent to the cooler 42, cooled in the cooler 42, and discharged from the cooler 42 to the pump 41 again.

Further details of the power generating system of the present embodiment will be described below with reference back to FIG. 1.

The power generating system of the present embodiment has a function to capture $CO_2$ from the atmosphere and a function to generate power using this $CO_2$. Therefore, the power generating system of the present embodiment has a structure in which a $CO_2$ capturing system is incorporated into the power generating system.

In general, $CO_2$ capturing systems require thermal energy in releasing $CO_2$ from the absorption liquid. Since this energy is enormous, the operating cost of the $CO_2$ capturing system increases. Therefore, in order to spread $CO_2$ capturing systems, it is necessary to reduce the energy used in the $CO_2$ capturing systems. Further, when $CO_2$ is captured from the atmosphere, a large amount of power to drive a blower fan and a large amount of thermal energy to regenerate $CO_2$ are required, and it is also necessary to reduce this energy.

On the other hand, the present embodiment not only captures $CO_2$ from the atmosphere, but also generates power using this $CO_2$. This makes it possible to use the energy (power) obtained by generating power as energy for capturing $CO_2$, and therefore makes it possible to reduce the energy required for capturing $CO_2$. For example, the energy provided externally to the power generating system of the present embodiment for capturing $CO_2$ can be made less than the energy provided externally to general $CO_2$ capturing systems for capturing $CO_2$.

Further, the present embodiment makes it possible to reduce greenhouse gases such as $CO_2$ in the atmosphere by capturing $CO_2$ from the atmosphere and generating power without burning fossil fuels.

Further, the present embodiment makes it possible to efficiently capture high-purity $CO_2$ gas by capturing $CO_2$ from the atmosphere through causing an absorption liquid to absorb $CO_2$ in the atmosphere and releasing $CO_2$ from the absorption liquid.

As described above, the present embodiment makes it possible to realize a power generating system (a $CO_2$ capturing and power generating system) that appropriately handles $CO_2$.

Second Embodiment

FIG. 3 is a schematic diagram showing a configuration of a power generating system of a second embodiment.

The power generating system of the present embodiment has a structure similar to the structure of the power generating system of the first embodiment. However, the power generating system of the present embodiment does not include the flow divider 4, the flow divider 16, the flow merger 18, the heat exchanger 21, and the cooler 22, but includes a vacuum pump 51.

Therefore, the mixed gas discharged from the gas-liquid separator 3 in the present embodiment is supplied only to the turbine 5. Further, the absorption liquid from the flow divider 13 to the evaporator 2 in the present embodiment is supplied to the evaporator 2 only via the intermediate heat exchanger 17.

Further, the condensation absorber 7 in the present embodiment includes an outlet 7a for discharging (extracting) gas from the condensation absorber 7. In the condensation absorber 7, the water vapor included in the mixed gas is condensed into condensed water, and the concentration of water vapor included in the mixed gas decreases. That is, as in the case of the cooler 22 of the first embodiment, the mixed gas including $CO_2$ and water vapor changes into a capture target gas including high purity $CO_2$ in the condensation absorber 7. The condensation absorber 7 discharges, from the outlet 7a, the capture target gas including $CO_2$ that is to be a capture target in the power generating system of the present embodiment. Note that in the condensation absorber 7, a portion of the $CO_2$ is absorbed by the absorption liquid, and the remaining $CO_2$ is discharged from the outlet 7a. The condensation absorber 7 of the present embodiment is an example of the capturer.

The vacuum pump 51 is installed for discharging (extracting) the capture target gas from the outlet 7a of the condensation absorber 7. The $CO_2$ included in the capture target gas that has passed through the vacuum pump 51 may be liquefied inside or outside the power generating system of the present embodiment.

The present embodiment makes it possible to use the energy (power) obtained by generating power as energy for capturing $CO_2$, and therefore makes it possible to reduce the energy required for capturing $CO_2$, as in the first embodiment.

Further, the present embodiment makes it possible to reduce greenhouse gases such as $CO_2$ in the atmosphere by capturing $CO_2$ from the atmosphere and generating power without burning fossil fuels.

Further, the present embodiment makes it possible to efficiently capture high-purity $CO_2$ gas by capturing $CO_2$ from the atmosphere through causing an absorption liquid to absorb $CO_2$ in the atmosphere and releasing $CO_2$ from the absorption liquid.

As described above, the present embodiment makes it possible to realize a power generating system (a $CO_2$ capturing and power generating system) that appropriately handles $CO_2$, as in the first embodiment.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A power generating system comprising:
   a cooling absorption tower configured to cause an absorption liquid to absorb carbon dioxide in atmosphere;
   an evaporator configured to heat the absorption liquid to release the carbon dioxide and water vapor from the absorption liquid, and discharge the absorption liquid that has released the carbon dioxide and the water vapor, and a first gas including the carbon dioxide and the water vapor;
   a turbine configured to be driven by a portion of the first gas;
   a generator configured to be driven by the turbine; and
   a capturer configured to condense the water vapor included in a remaining portion of the first gas, and capture the carbon dioxide that is included in the remaining portion of the first gas and to be a capture target.

2. The system of claim 1, wherein the capturer condenses the water vapor included in the remaining portion of the first gas discharged from the evaporator, and captures the carbon dioxide that is included in the remaining portion of the first gas and to be the capture target.

3. The system of claim 1, wherein the capturer is a cooler configured to cool the first gas to condense the water vapor included in the first gas.

4. The system of claim 1, further comprising a condensation absorber configured to cool the first gas discharged from the turbine to condense the water vapor included in the first gas, cause the absorption liquid discharged from the evaporator to absorb the carbon dioxide included in the first gas, and discharge the absorption liquid that has absorbed the carbon dioxide to the cooling absorption tower.

5. The system of claim 4, wherein
   the cooling absorption tower cools the absorption liquid that has absorbed the carbon dioxide in atmosphere, and supplies the absorption liquid that has absorbed the carbon dioxide and has been cooled to the evaporator via the condensation absorber, and
   the cooler cools the first gas discharged from the turbine with the absorption liquid supplied from the cooling absorption tower.

6. The system of claim 5, further comprising a first heat exchanger configured to perform heat exchange between the absorption liquid directed from the evaporator to the condensation absorber and a portion of the absorption liquid directed from the cooling absorption tower to the evaporator via the condensation absorber.

7. The system of claim 5, further comprising a second heat exchanger configured to perform heat exchange between the remaining portion of the first gas directed from the evaporator to the capturer and a remaining portion of the absorption liquid directed from the cooling absorption tower to the evaporator via the condensation absorber.

8. The system of claim 1, wherein the capturer condenses the water vapor included in the first gas discharged from the turbine, and discharges the carbon dioxide that is included in the first gas and to be the capture target.

9. The system of claim 1, wherein the capturer is a condensation absorber configured to cool the first gas discharged from the turbine to condense the water vapor included in the first gas, cause the absorption liquid discharged from the evaporator to absorb a portion of the carbon dioxide included in the first gas, and discharge a remaining portion of the carbon dioxide included in the first gas as the capture target.

10. The system of claim 9, further comprising a pump configured to discharge the carbon dioxide as the capture target from the condensation absorber.

11. The system of claim 9, wherein
    the condensation absorber discharges the absorption liquid that has absorbed the portion of the carbon dioxide to the cooling absorption tower,
    the cooling absorption tower causes the absorption liquid to absorb the carbon dioxide in atmosphere, cools the absorption liquid, and supplies the absorption liquid that has absorbed the carbon dioxide and has been cooled to the evaporator via the condensation absorber, and
    the condensation absorber cools the first gas discharged from the turbine with the absorption liquid supplied from the cooling absorption tower.

12. The system of claim 11, further comprising a first heat exchanger configured to perform heat exchange between the absorption liquid directed from the evaporator to the condensation absorber and the absorption liquid directed from the cooling absorption tower to the evaporator via the condensation absorber.

13. The system of claim 1, further comprising
    a gas-liquid separator configured to separate the absorption liquid and the first gas discharged from the evaporator, and discharge the first gas separated from the absorption liquid,
    wherein
    the turbine is driven by the portion of the first gas discharged from the gas-liquid separator, and
    the capturer condenses the water vapor included in the remaining portion of the first gas discharged from the gas-liquid separator, and discharges the carbon dioxide that is included in the remaining portion of the first gas and to be the capture target.

14. The system of claim 1, further comprising a heater configured to supply heat for heating the absorption liquid to the evaporator.

15. A power generating method comprising:
    causing an absorption liquid at a cooling absorption tower to absorb carbon dioxide in atmosphere;
    heating the absorption liquid in an evaporator to release the carbon dioxide and water vapor from the absorption liquid, and discharging, from the evaporator, the absorption liquid that has released the carbon dioxide and the water vapor, and a first gas including the carbon dioxide and the water vapor;
    driving a turbine by the first gas;
    driving a generator by the turbine; and
    condensing, in a condensation absorber, the water vapor included in the first gas, and capturing, from a capturer, the carbon dioxide that is included in the first gas and to be a capture target.

* * * * *